Figure 11:
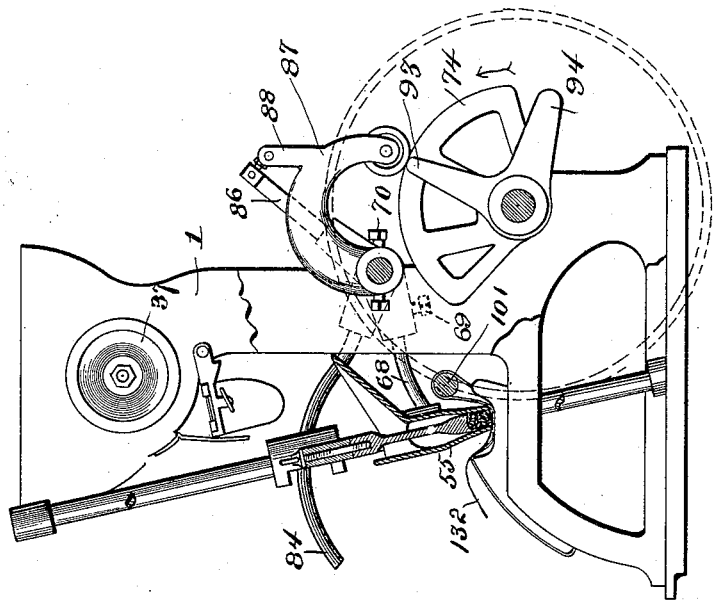

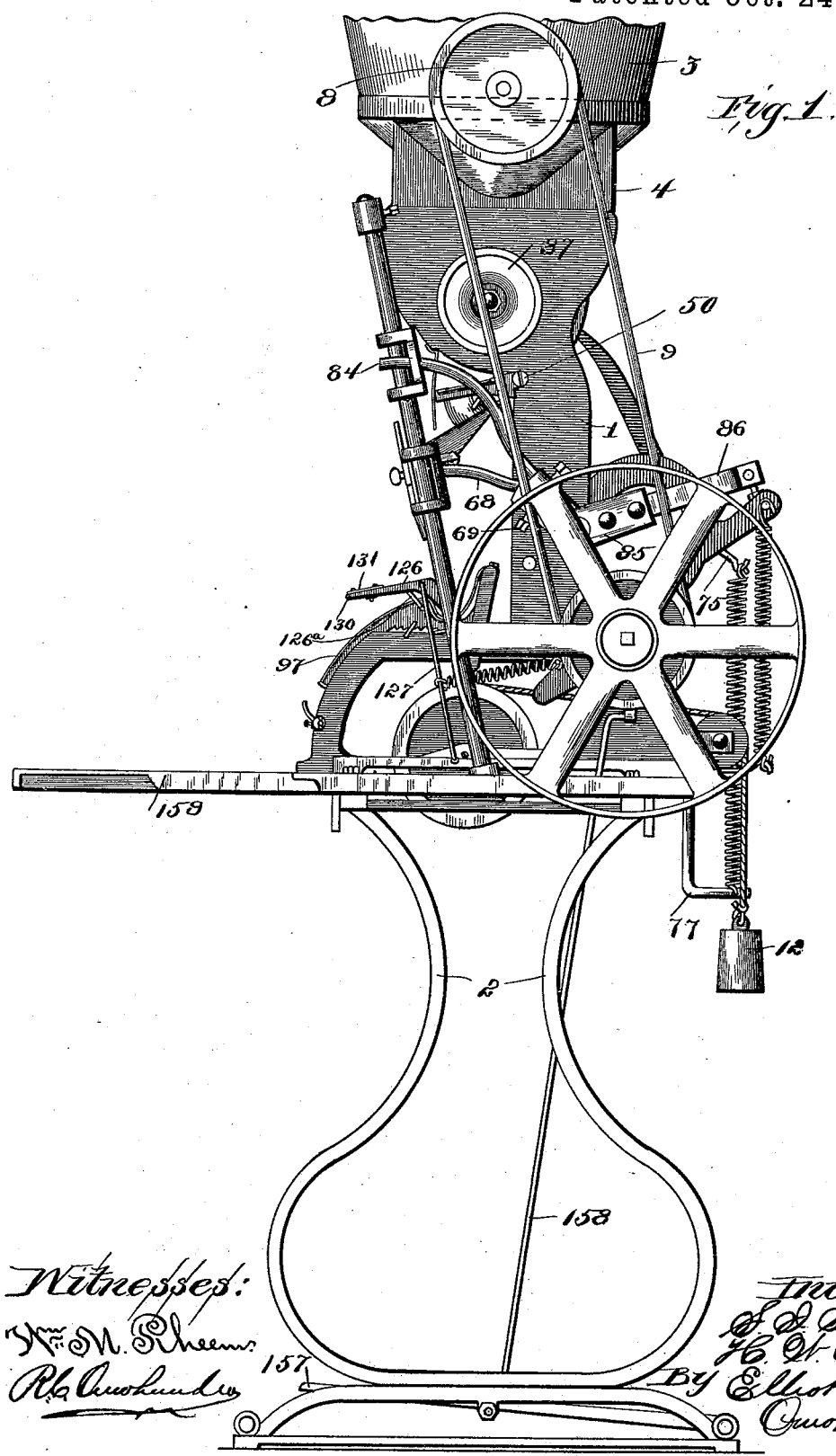

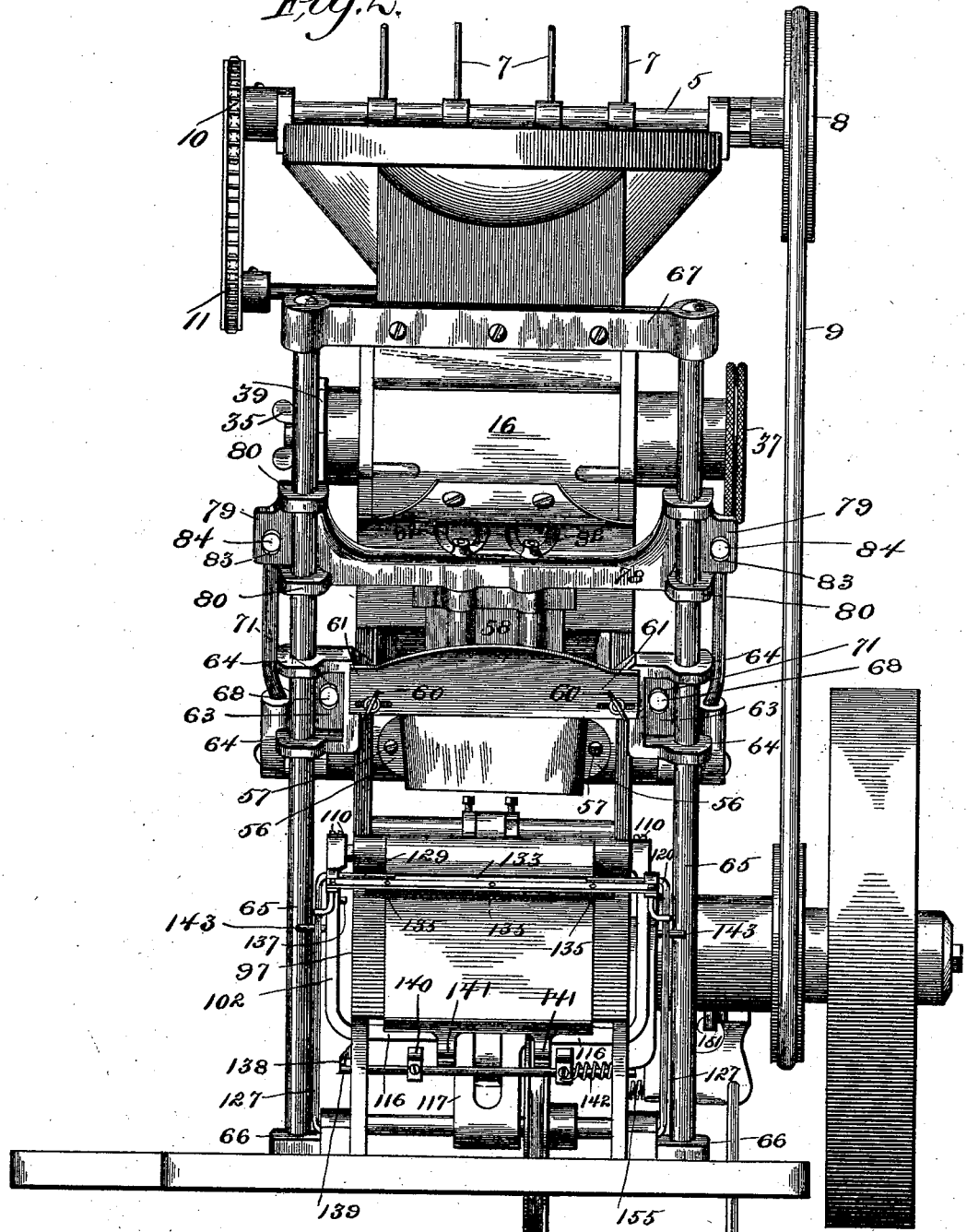

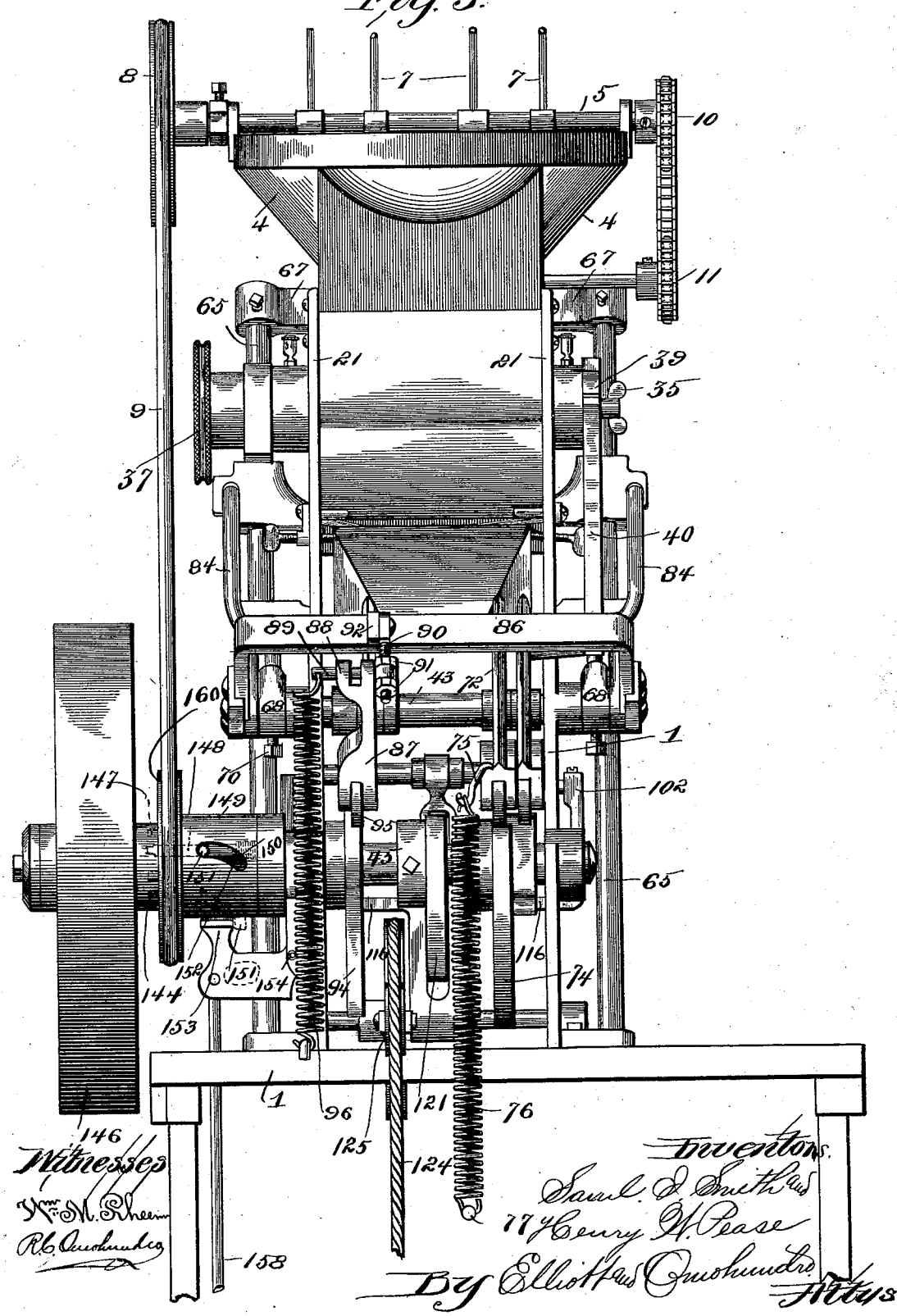

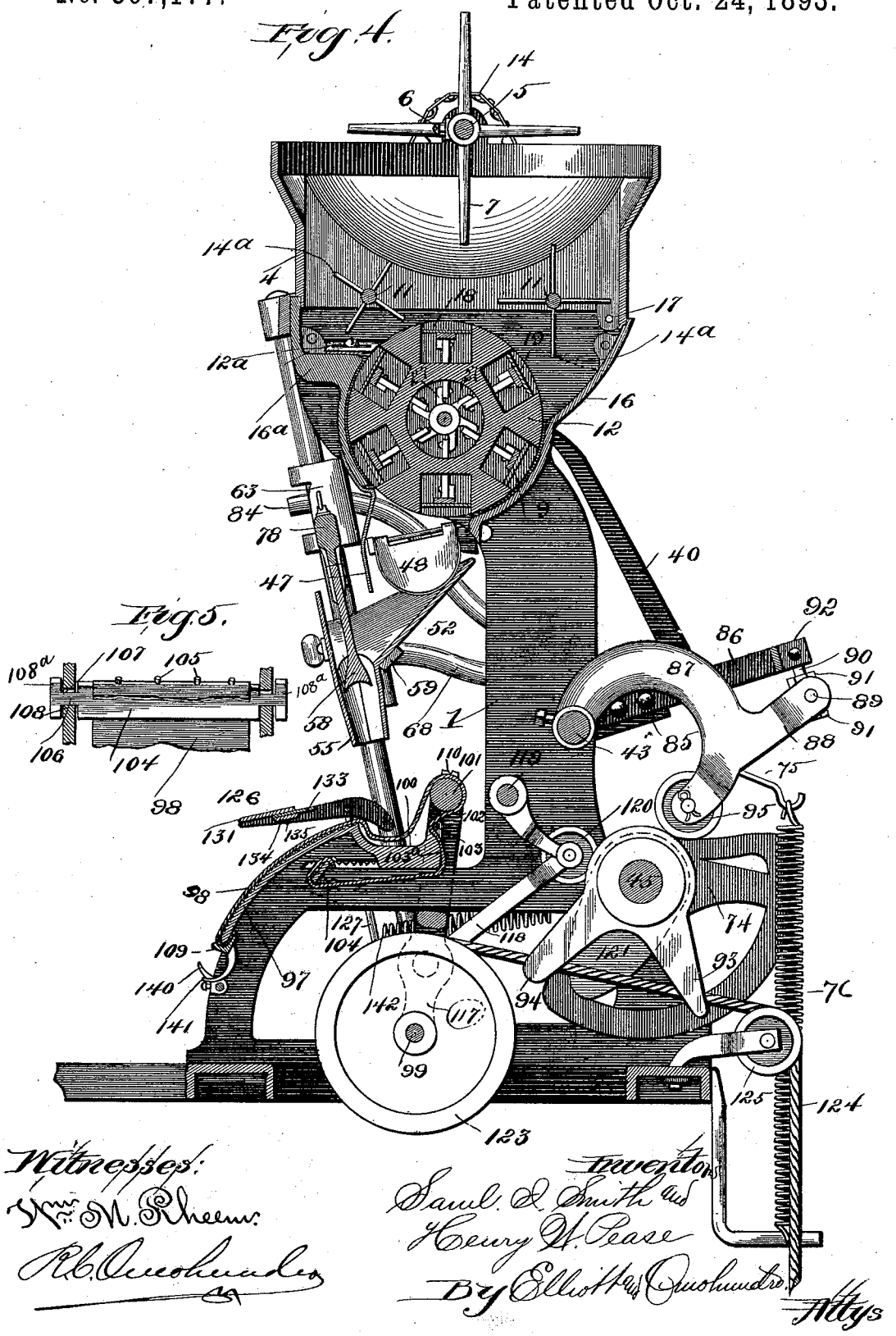

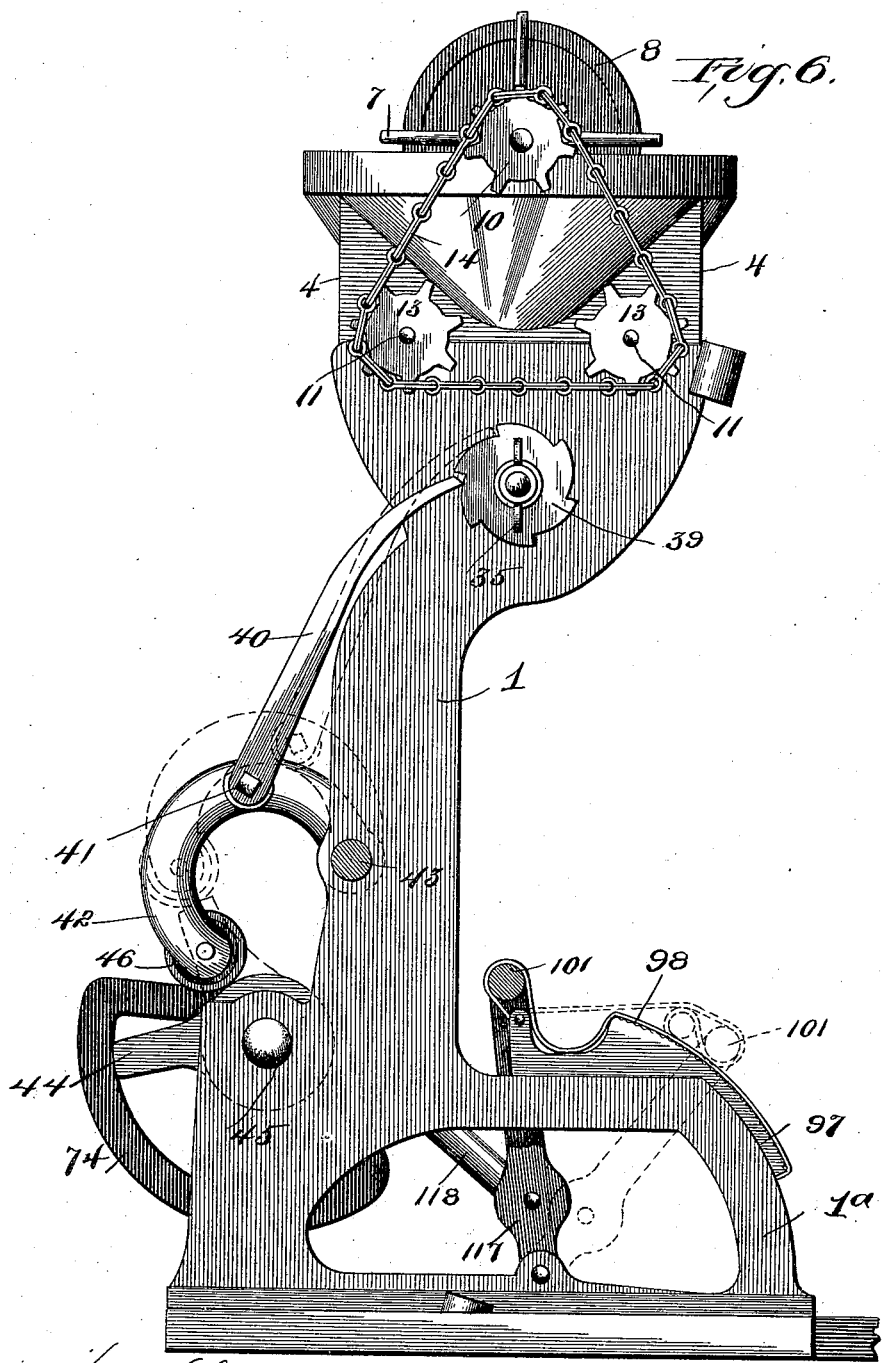

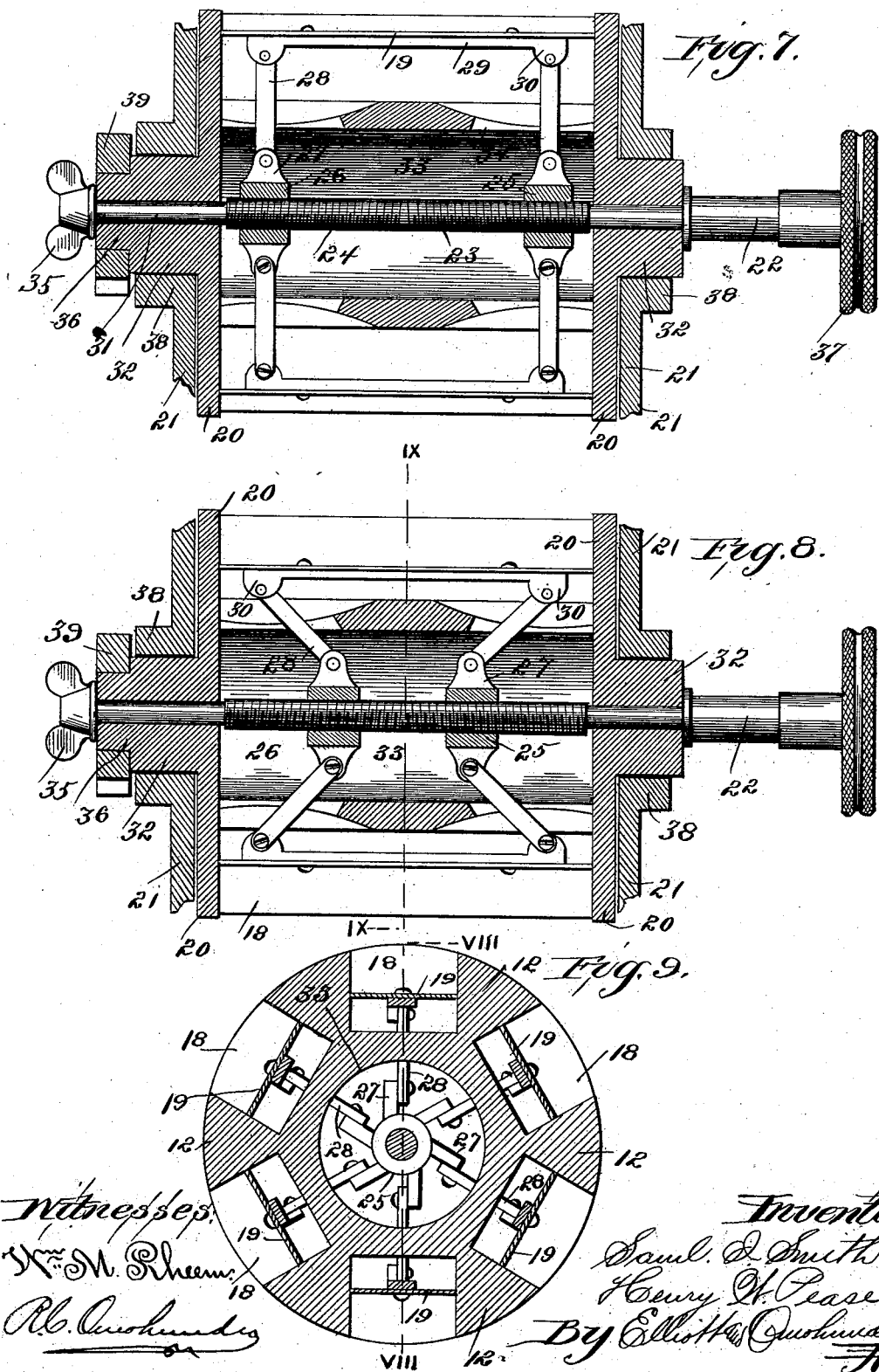

(No Model.) 9 Sheets—Sheet 7.

S. I. SMITH & H. W. PEASE.
CIGAR BUNCHING MACHINE.

No. 507,177. Patented Oct. 24, 1893.

Witnesses
Wm. N. Rheem
R. C. Omohundro

Inventors,
Saml. I. Smith
Henry W. Pease
By Elliott & Omohundro
Attys (No Model.) 9 Sheets—Sheet 8.
S. I. SMITH & H. W. PEASE.
CIGAR BUNCHING MACHINE.

No. 507,177. Patented Oct. 24, 1893.

(No Model.)    S. I. SMITH & H. W. PEASE.    9 Sheets—Sheet 9.
CIGAR BUNCHING MACHINE.
No. 507,177.    Patented Oct. 24, 1893.
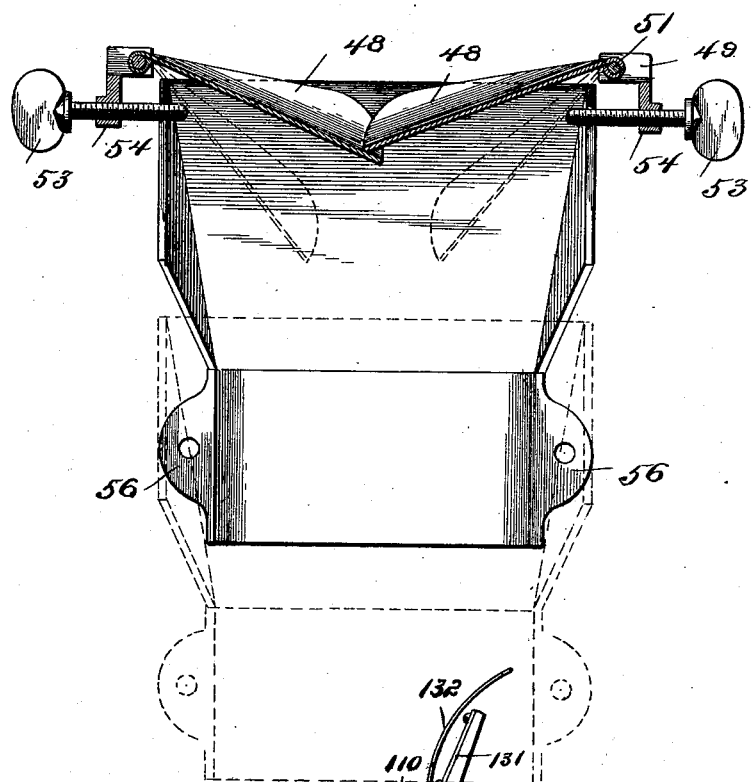
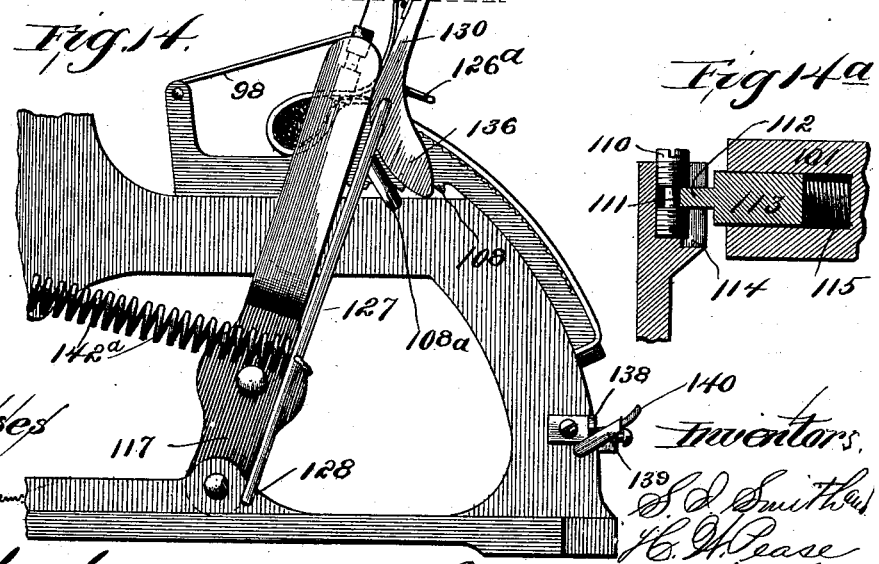

UNITED STATES PATENT OFFICE.

SAMUEL I. SMITH AND HENRY W. PEASE, OF CHICAGO, ILLINOIS, ASSIGNORS TO BERTHA S. SMITH, OF SAME PLACE.

CIGAR-BUNCHING MACHINE.

SPECIFICATION forming part of Letters Patent No. 507,177, dated October 24, 1893.

Application filed December 15, 1891. Serial No. 415,162. (No model.)

*To all whom it may concern:*

Be it known that we, SAMUEL I. SMITH and HENRY W. PEASE, citizens of the United States, residing in the city of Chicago, county of Cook, and State of Illinois, have invented certain new and useful Improvements in Cigar-Bunching Machines, of which the following, in connection with the accompanying drawings, is a full, clear, and exact specification.

Our present invention relates to machines for automatically producing the inner part or bunch of a cigar, which part, as will be understood, consists of the filler and the binder in which the filler is wrapped, and should, when completed or discharged from the bunching machine, assume the shape which it is desired that the finished cigar should have. In devices for accomplishing this end there are usually employed a feed hopper for containing a ready supply of scrap tobacco of which the filler is composed; a rolling device for wrapping the binder firmly about the filler; a funnel for directing the proper charge of filler or scrap into the rolling device, with a plunger working through the funnel for giving the filler the initial pressing, and a feeding mechanism for obtaining from the hopper the proper charge of filler scrap and delivering the same automatically into the funnel. But these mechanisms as heretofore employed have been but partially effective, each, owing to some defect in arrangement or construction or to the lack of proper co-adjutory elements, failing to satisfactorily perform its allotted function. The prime source of difficulty has been in the hopper, the tobacco scrap being light and feathery is apt to honeycomb around the feeding cylinder or charger and cease to fall into its pockets, thus at times delivering but a partial charge into the funnel and at others delivering none at all. A further difficulty has been that the tobacco in discharging from the funnel becomes more or less scattered in the rolling device and also that the plunger in descending through the funnel is apt to skip or leave behind it scraps of the filler which therefore do not become properly incorporated and compressed in the bunch.

With a view to overcoming these difficulties the objects of our invention are, first, to provide improved means for so agitating the supply of scrap just above the feeding device that it will always be in a condition to readily fall into the pockets of the feeder; second, to provide improved means for directing the bulk of the charge into that end or portion of the funnel or matrix in which it is desired that the bunch should be largest; and third, to cause the funnel to descend before the filler is discharged into it, and to remain in this position until the plunger has descended and ascended and redescended at least once again.

A further object of our invention is to so improve the arrangement of the agitators that they will act as scrap cleaners, that is to say, so as to gather from the scrap the fragments of stems and foreign matter which are usually commingled with it.

A still further object is to provide improved means for making the pockets of the feeding or charging device adjustable so as to be capable of having their capacity readily and conveniently varied with the size of the bunch desired. And yet another object is to have the funnel and plunger removable and adjustable relative to each other, so that they may be readily replaced by others when it is desired to produce a bunch of another shape.

Our invention therefore consists in certain features of novel arrangement and construction hereinafter described and claimed, for carrying out these objects, as well as certain other objects of minor importance.

In order that others skilled in the art may be enabled to make and use the invention, we will now fully describe the same in connection with the accompanying drawings and then particularly point it out in the claims.

In the said drawings, Figure 1 is a side elevation of the complete machine. Fig. 2 is a front elevation on an enlarged scale, the supporting frame or stand and also the hopper being omitted. Fig. 3 is a similar view in rear elevation. Fig. 4 is a vertical transverse sectional view. Fig. 5 is a detail view of the apron adjuster hereinafter described. Fig. 6 is a detail view looking from the opposite side of the machine to that presented in Fig.

4, showing the mechanism for operating the agitators, and also showing the manner in which the apron is actuated to roll the bunch. Fig. 7 is an enlarged detail sectional view of the charging or feeding cylinder, taken on the line VIII VIII, Fig. 9, but showing the tobacco-cavities adjusted to their minimum capacity. Fig. 8 is a similar view showing the cavities adjusted to nearly their greatest capacity. Fig. 9 is a transverse section taken on the line IX—IX, Fig. 8, and Figs. 10 to 15, inclusive, are views illustrating the successive positions that the parts assume during the formation of a bunch, certain details of construction being omitted for the sake of simplicity and clearness—Fig. 13, being an enlarged detail view of a part only of the funnel and the guide chutes, and Fig. 14 an enlarged detail view of the apron actuating mechanism and binder holder, all hereinafter more fully described, and Fig. 14$^a$ is an enlarged detailed view hereinafter described.

In the drawings, wherein like signs of reference indicate like parts throughout the several views, 1 indicates the main frame of the machine, which may be of any suitable form or design, and constructed of any suitable material, and which, for the sake of convenience and ornament of design, is preferably supported upon a pedestal or stand, 2, of any suitable construction, as shown in Fig. 1.

The scrap or tobacco, of which the bunches are usually formed, is thrown into a superposed hopper, 3, which is supported upon the upper edge of an agitator box, 4, in such a manner that it may be conveniently removed from such box at will. As clearly shown in Fig. 4, this agitator box is open at the top, so as to receive the scrap as it descends from the hopper, and is provided at its upper part with an agitator shaft, 5, to which are adjustably secured by means of set screws, 6, a number of agitator arms, 7, whose allotted function is to keep the scrap in the lower end or neck of the hopper constantly agitated, and thus prevent it from clogging at that point. This agitator is driven or rotated by a pulley, 8, keyed to one end of its shaft, 5, over which passes a belt, 9, which latter derives its motion from another part of the machine, hereinafter described, and to the other end of its shaft, 5, is keyed or secured a sprocket wheel, 10, as more clearly shown in Fig. 6.

The upper portions of the walls of the box, 4, are preferably rounded or concaved, as shown, so as to make room for the sweep of the agitator arms, 7, but its lower walls we prefer to have substantially vertical, and in them we journal a number of countershafts, 11, preferably but two, one on either side of the summit of the feed cylinder, 12, the box, 4, being also open at its bottom. Each of these shafts, 11, is provided, at its outer end, with a sprocket wheel, 13, which wheels derive their motion from the wheel, 10, through the medium of a sprocket chain belt, 14. These countershafts also are provided with a number of radial arms or pins, 14$^a$, which constitute them agitators, and which not only effectually prevent the clogging of the scrap immediately above the cylinder, but they perform the more important and difficult function of cleaning the scrap; and as the superiority of the smoking qualities of the cigar depends largely upon the condition of the scrap before it reaches the binder, this latter feature of our invention is a matter of vital importance.

It is well known that the scrap is liable to become contaminated with foreign matter, such as bits of thread or baggigg, straw, hair, &c., and that in cutting scrap the stems and stringy portions of the tobacco are apt to escape the vigilance of the attendant and find their way into the machine, and thence into the bunch, and ultimately into the completed cigar itself. These substances when left in the scrap, as may well be imagined, not only preclude the formation of a perfect bunch, but occasion considerable annoyance and displeasure to the smoker. With a machine constructed according to our invention this evil is largely if not wholly overcome by the combined agitators and scrap cleaners, which act to gather the threads, stems, &c., left in the scrap, and by their continued rotation in one direction wind such fragments upon their shafts, 11, where they remain until removed by the operator.

We prefer to arrange all of the agitators substantially parallel with each other and the cylinder, with the main agitator located above and between the lower two as in this position they are most effectual in thoroughly agitating the whole lower portion of the supply of scrap.

For the sake of convenient access to the lower agitators and scrap cleaners and also to the feed cylinder and its casing or shell, 16, for the removal of the collected litter and the inspection of the parts, we prefer to make the agitator box 4 separate from the cylinder shell and hinge it thereto at the point, 17, so that it may be tipped backward at will, carrying the agitators with it.

The feed cylinder, 12, may be constructed of iron, wood or other suitable material and it may be solid or of skeleton form, but in either event it is provided with one or more longitudinal peripheral pockets, 18, into which the scrap falls as it passes under the agitator box. Each of these pockets is designed to contain a single charge or in other words the proper amount of scrap for the manufacture of a single bunch, and in order that the size of the bunch may be definitely regulated, each pocket is provided with a movable bottom plate, 19, (see Figs. 7 to 9, inclusive) which is adapted to be raised or lowered in the pocket and thus decrease or increase its capacity accordingly. As shown in Figs. 7 and 8 the pockets fall short of the ends of the cylinder so as to leave end guide walls or supports, 20, against which the ends of the bottom plates, 19, rest, but of course the main purpose of such guides being to relieve the ends of the plates from friction against the said side walls, 21, during the revolution of the cylinder. Passing axially through the feed cylinder, 12, is an adjusting screw or shaft, 22, whose intermediate portion is provided with right and left hand screw threads, 23 and 24, respectively, and screwed upon these portions, 23, 24, respectively, are nuts, 25, 26, each of which is provided with radial perforated wings or ears, 27, equal in number to the number of feed pockets employed in the cylinder, and the diametrically opposite ears on each nut are connected to the diametrically opposite bottom plates, 19, by means of arms or links, 28, which, being pivoted to said ears, constitute toggles. As a convenient means of attaching these toggle arms to the plate, 19, we have preferably secured to the bottom or inner side of each plate a longitudinal bar, 29, which is provided at or near each end with the perforated ear or lug, 30, to which the toggle arms are pivoted and which are so disposed that the toggles will have bearing in a line passing midway between the side of the plates. Thus it will be seen that when the shaft or screw, 22, is turned in one direction the nuts, 25, 26, will be caused to approach each other with equal velocity and consequently draw all of the bottom plates inward away from the periphery of the cylinder, so as to increase the capacity of each feed pocket; and when such screw is turned in the opposite direction the nuts will move outward toward the extremities of the screw, thus straightening the toggles and forcing the bottom plates outward or toward the periphery of the cylinder, and accordingly decreasing the capacity of each of the said pockets, the cylinder being cored out along its center, as shown at 33, to permit of the movement of the nuts, and such cored portion having communication with the pockets, 18, through cutaway portions, 34, to permit of free oscillation of the toggle arms.

As a convenient means of locking the bottom plates, 19, in any desired adjustment, by preventing the accidental rotation of the screw, 22, we prefer to provide the outer extremity of the plain portion 31 of such screw, which passes loosely through the journal 32 of the cylinder, with a threaded portion, upon which is turned a thumb nut 35, having its bearing against the hub 36, hereinafter described. The screw, 22, is rotated for the adjustment of the plates, 19, by means of a hand wheel or knob, 37, rigidly secured to its opposite end and bearing against the other journal, 32, of the cylinder, thus preventing endwise displacement of the screw when the nut, 35, is turned for tightening it.

In order that each pocketful of tobacco, contained in the cavities or pockets, 18, may be shaved off even with the periphery of the cylinder, 12, and thus avoid jamming of the cylinder in its shell, 16, by projecting stems or tufts of the scrap becoming wedged between such parts, and at the same time preventing an overcharge of the filler being fed, we secure upon a shoulder, $16^a$, of the shell, 16, an adjustable knife, $12^a$, whose inner edge is arranged in close proximity to the periphery of the cylinder.

The feed cylinder, as before intimated, is provided with end journals, 32, which have bearings in suitable journal boxes, 38, formed in the side walls, 21, of the cylinder shell or casing, 16, and beyond the journal, 32, on one side, with a hub, 36. This hub is square or prismatic in cross section and carries a ratchet wheel, 39, (see Fig. 6,) the teeth of which are engaged by an upright pawl, 40, for causing the feed cylinder to revolve sufficiently at each operation of the machine, to bring one of the pockets, 18, opposite an opening in the lower side of the casing, 16, as shown in Fig. 4, so as to permit the charge of scrap to fall from such pocket. This pawl, 40, is secured at its lower end, preferably by means of a pivot bolt, 41, to a curved lever, 42, which, in turn, is pivoted at one end to the frame, 1, preferably by means of a crank shaft, 43, which extends across the frame and constitutes the pivot of other levers and cranks, hereinafter described, the lever, 42, being capable of oscillation without rotating the said shaft. The other extremity of the lever, 42, is arranged to be impinged by a cam, 44, rigidly secured to a cam shaft, 45, having suitable journal bearings in the side pieces of the frame, 1; and for the sake of lessening the friction between such cam and lever, the latter is provided with an anti-friction roller, 46, journaled in the end thereof. Hence it will be seen that at every revolution of the cam shaft, the pawl, 40, will be caused to rotate the feed cylinder to discharge a single one of its pockets, and will then descend, the short cam, 44, having passed the lever, 42, into the position shown in full line, Fig. 6, ready to engage another tooth of the ratchet wheel.

Secured to the lower side of the casing, 16, in front of the opening in the bottom thereof, is a shield, 47, (Fig. 4,) which guards such opening and prevents the scrap from scattering and missing its proper destination when discharged by the feeding cylinder; and immediately behind this shield, directly under the opening in the lower side of the cylinder casing, is arranged an adjustable guide chute. This guide chute preferably consists of two upwardly folding trough shaped leaves, 48, (see Figs. 1 and 13,) each of which is hinged at its outer or upper end to a supporting bracket, 49, secured by screws, 50, or other suitable means, to the frame, 1, the leaves, 48, being secured or pivoted to shafts or pintles, 51, mounted in the brackets. This adjustable chute, as clearly shown in Fig. 4, is arranged just over the funnel, 52, which directs the scrap into the matrix and apron pocket, hereinafter described; and the purpose of such chute is to direct the bulk of the tobacco into either end or into the middle of the matrix, hereinafter described, accordingly as it is desired to have the bunch larger at one end or at the middle. In order to cast the scrap to one side or the other, the leaf at the side on which it is desired that the end of the bunch should be enlarged, is allowed to descend by gravity to the desired extent and the other leaf is elevated so as to cast the tobacco all to the opposite side or end of the matrix. Naturally when the scrap strikes the funnel it will scatter to some extent but the bulk of it will remain on one side or end only, and thus descend into the matrix and so remain in the completed cigar. When it is desired that the bunch should be bulky in the center or middle, the lower ends of the leaves 48 are brought together more or less accordingly as it is desired to produce a greater or less concentration of the scrap at that point. These leaves, 48, may be elevated by any suitable means which will readily suggest itself to any skilled mechanic, and as a preferable and simple form of means for doing this we have shown two set screws, 53, one for each of the leaves 48, which have screw threaded bearings in ears, 54, on the under sides of the brackets, 49, and are adapted to impinge the said leaves at their inner ends on the under sides thereof, as shown in Fig. 13.

An adjustable chute for properly distributing the tobacco as it enters the matrix, or before it is made up into the bunch, is a feature of the greatest importance, for if the tobacco is not distributed in the matrix or apron pocket, in conformity with the shape it is desired it shall assume in the ultimate cigar, it is very evident that no subsequent operation can produce it properly, or with any degree of certainty.

The funnel, 52, is divided vertically, or, in other words, it is formed in two sections, a front and a rear section, as shown in Fig. 4, and this because it is necessary that its lower end or neck, which constitutes the matrix, 55, should be formed of stout material, ordinarily cast metal, and the shape of the whole is such as could not be cast integral. The sections are provided with perforated ears, 56, by means of which, and screws or bolts, 57, they are held securely together. However, the form of combined funnel and matrix, shown and described is preferable rather than essential, and it will be understood that other forms, cast or otherwise made integral, might be employed. In order that the funnel may be adjusted transversely of the machine relative to the plunger, 58, which necessarily passes through it, we rest the rear wall of the funnel upon an inclined cross head, 59, so as to slide freely therealong, and support its front side by means of set screws, 60, which pass through slotted ears, 61, formed on the sides of the front section of the funnel and screw into the ends of the said cross head, 59. Thus it will be seen that by loosening the screws, 60, the funnel may be adjusted to one side or the other. At each end of the cross head, 59, is a head, 63, which is provided with aligned bearings or perforated ears, 64, through which pass two upright guide rods or rails, 65, one through each of the heads, 63, which rods constitute a guide way for the reciprocating funnel, 52, and are stepped at their lower ends in blocks, 66, formed on or secured to the main frame, and secured at their upper ends by a suitable bar or support, 67, which in turn is fastened to the top of the shell, 16, or other fixed part.

Figure 10:
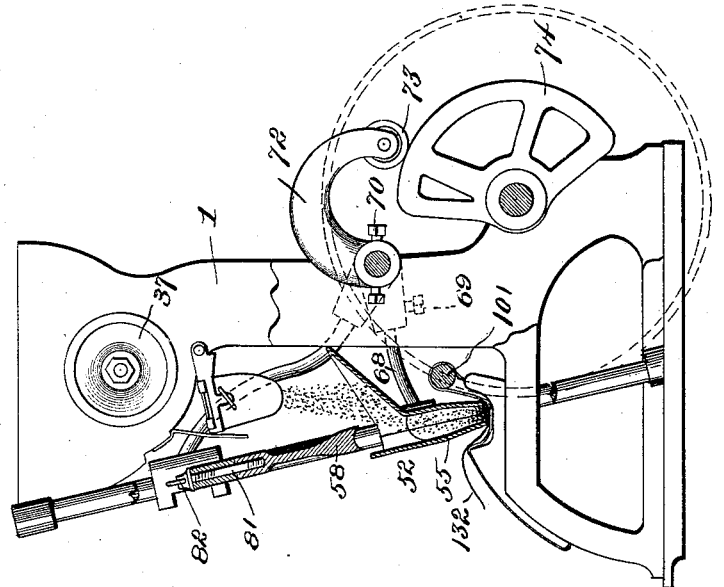

As clearly shown in Fig. 3, the ends of the rock shaft, 43, project through and beyond the frame, 1, on both sides of the machine, so as to afford means for the attachment thereto of two crank arms, 68, one at each end, each of which is preferably made in two parts, one part forming a socket for the other, and in which socket the other is held by means of a set screw, 69, as shown in Fig. 1, and in dotted lines in Figs. 10 and 11, such sockets being rigidly secured to the crank shaft, 43, by means of set screws, 70. The forward or free ends of the crank arms, 68, are slightly curved, as shown, and pass through perforations, 71, in the heads, 63, so that when such arms are oscillated they will cause the cross head, 59, together with the funnel, 52, to rise and fall in unison therewith. As a means for causing this movement of the crank arms, 68, we have secured to the crank shaft, 43, an upwardly curved crank arm, 72, (see Fig. 10) whose anti-friction roller, 73, is impinged by a long cam, 74, secured to the cam shaft, 45, the arm, 72, being curved, as shown, to permit of its downward movement after the cam has revolved past the roller. Thus it will be seen that inasmuch as the arms, 68, as also the arm, 72, are secured to the crank shaft, they in effect constitute one lever for causing the movement of the funnel along its guide way. The arm, 72, carries at its rear end a hook, 75, (see Figs. 1 and 3) to which is attached a spring, 76, the lower end of the spring being secured to a suitable fixed bracket as 77. In this manner the spring tends to keep the funnel, 52, normally elevated, while the office of the cam, 74, is simply to depress such funnel at the proper time.

Situated on the guide rails, 65, above the cross head, 59, is another cross head, 78, which is provided at each end with a head, 79, having bearings, 80, like the bearing, 64, for the passage of the rods, 65. To this second cross head the plunger, 58, is secured by means of screws, 81, which pass through the cross head and have threaded ends engaging in the plunger, the upper ends of the said screws being threaded also and provided with tightening taps, 82. The heads, 79, are also each provided with a perforation, 83, through each of which passes a crank arm, 84, similar in all respects to the crank arms, 68, only a trifle longer and a little more curved at their free ends than the latter. These crank arms, 84, are also mounted on the projecting ends of the crank shaft, 43, outside of the arms, 68, but unlike the said arms, 68, they are journaled on the shaft with capability of oscillating independently thereof. Also unlike the crank arms, 68, the arms, 84, have rearwardly projecting portions, 85, to which are secured the respective ends of the U-shaped yoke or cross bar, 86, which ties such crank arms, 84, together and causes them to operate in unison, and which, together with the said crank arms, 84, virtually constitutes one continuous lever. Loosely pivoted to the crank shaft, 43, is a curved lever, 87, which is provided with a perforated ear, 88, through which passes an eye bolt, 89, (see Fig. 3) and through the eye of this bolt passes a threaded bolt, 90, which latter is provided with jam nuts, 91, for locking it adjustably to the eye bolt, 89; and the head of the bolt, 90, is pivoted in any suitable manner to an ear or lug, 92, on the yoke, 86. The purpose of this adjustable connection between the lever, 87, and the plunger lever is to afford means for causing the plunger to descend more or less into the apron pocket, so that bunches of various thicknesses may be made without causing the plunger to impinge the tobacco with an excessive or insufficient pressure.

In cigar bunching machines it is highly important that the plunger should be caused to ram the charge into the apron pocket at least twice before the matrix or funnel rises, and this for the reason that the plunger in going down the first time when the lower end of the funnel or other part constituting the matrix is full of the scrap, it will more than likely pass some of the scrap which, if the plunger did not rise entirely out of the neck of the funnel and ram the charge a second time, would not get into the bunch at all but would fall out upon the apron and thence onto the floor as soon as the plunger arose from the funnel, and furthermore the double plunge produces a better and more definitely shaped bunch, for obvious reasons. To this end we provide the cam shaft with a double cam having two noses, 93, 94, which are arranged to pass in succession under the antifriction roller, 95, of the lever, 87, and thus alternately cause such lever to rise and fall, the said lever being pulled downward by a spring, 96, secured at its upper end to the eye bolt, 89, and at its lower end to the frame, 1. As shown in Figs. 11 and 12, the cam noses, 93, 94, are so arranged with relation to the funnel cam, 74, that the latter does not fully pass the end of the funnel lever, 72, until the second nose, 94, has elevated the lever, 87, and consequently depressed the plunger a second time, it being of course understood that the funnel cannot rise as long as the lever, 72, is supported on the cam, 74; and neither can it rise while the lever 87, is elevated for the reason that at such times the plunger is down and its cross head, 78, precludes the upward movement of the cross head, 59. When, however, the second nose, 94, has passed the lever, 87, both levers are free to descend under the influence of their springs, 76, 96, and the plunger and funnel thus rise together.

Suitably supported upon a forward projection, 1$^a$, of the frame, 1, is the rolling bed, 97, whose surface is preferably corrugated as shown, to prevent the slipping of the bunch rolling apron, 98, and is struck on the arc of a circle of which a transverse shaft, 99, journaled in the base of the frame, 1, is preferably the center. This bed near its upper end is provided with a cavity or depression, 100, into which a portion of apron, 98, is adapted to be depressed by the lower end, 55, of the funnel. The slack of the apron which is depressed into this cavity, 100, should of course always be proportionate to the size of the bunch to be produced and also to the degree of tightness which it is desired to roll the same; and in order that this slack may be readily and accurately adjusted, we pass the inner end of the apron between a guide bar, 103, and a curved wall or end, 103$^a$, at the rear of the cavity, 100, as clearly shown in Fig. 4, and secure its extreme end to an apron adjusting bar, 104. This adjusting bar, as shown in Fig. 5, consists of a plate having pins, 105, along its upper edge, which pass through the apron, and at or near its ends it is provided with square or angular journals, 106, located between an upper notched edge, 107, of a part of the bed, 97, and a plain edge, 108, of a part of the frame, 1$^a$. The apron is secured to the top of the plate, and then passed under is lower edge so as to tend to rotate it on its journals, 106, but the said journals are incapable of rotation in the direction of the pull on the apron when in the oblique position shown in Fig. 4, as the upper edges when in this position engage the notched edge 107, and therefore the bar can be moved along the slot only when its lower edge is turned in the direction opposite to the pull on the apron. The outer ends of the journals, 106, are provided with thumb bars, 108$^a$, which while affording means for the adjustment of the bar, prevent the journals from slipping out of place. With this arrangement of apron adjusting bar we are also enabled to adjust the sides or edges of the apron with relation to each other, that is to say, to produce more slack at one end of the apron roller than at the other, which is accomplished by moving one end only of the bar backward or forward according to the character of the adjustment desired. The importance of being able to accomplish this latter adjustment will be readily appreciated for it is well known that the shape of the apron actuating rollers vary with the form of the cigar to be produced—that is some are larger at one end than at the other—and since this is the case it is obvious that the apron should be adjusted in the described manner so as to fit the rollers throughout the extent of the latter and conform to the shape of the bunch. The lower end of the apron is clamped to the bed, 97, by means of an angle iron, 109. Situated under the apron bed, transversely of the rolling bed, is the apron actuating roller, 101, which is journaled in the upper ends of a pair of rocker arms, 102, arranged one on each side of the rolling bed and adapted to carry the roller, 101, over the latter in an arc substantially concentric therewith, and these arms, combined with the means (hereinafter described) for oscillating them, and the apron actuating roller 101, we will hereinafter term the "apron actuating device or mechanism." The apron actuating roller is capable of adjustment to and from the bed, 97, through the agency of screws, 110, set axially one in the end of each of the arms, 102, and having circumferential grooves, 111, in which the reduced ends, 112, of the journals, 113, of such roller engage as shown in Fig. 14ª—the ends of the arms, 102, being of course provided at their inner sides with longitudinal slots, 114, for the reception and passage of the journal ends, 112. The roller, 101, is preferably provided with a central bore in which is located a spring, 115, which holds the movable journal, 113, also located in said bore, outward in proper position, so that at any time when it is desired to remove the roller, it is only necessary to press the journal inward to disengage the end, 112, from the groove, 111. The arms, 102, are secured to the rock shaft, 99, preferably by means of a yoke, 116, whose lower end is preferably formed with parallel portions, 117, between which is pivoted one arm of a toggle, 118, whose other arm is pivoted at its far end to a short transverse pivot shaft, 119. The joint of this toggle is provided with an anti-friction roller, 120, which is arranged to be engaged by an approximately V-shaped cam, 121, secured to the cam shaft, 45, in such a position with relation to the other cams that it will begin to act upon the roller, 120, as soon as the funnel has risen out of the pocket, 100, and will continue to act on such roller, that is push it forward and straighten the toggle and thereby oscillate the rocker arms, 102, until the roller, 101, had traveled the full extent of the rolling bed and deposited the bunch in the bunch receiver described farther on. When the apex of the cam, 121, has passed the roller, 120, the arms, 102, immediately begin to resume their retracted position, shown most clearly in Fig. 4, under the influence of a weight, 122, attached to a pulley, 123, keyed on the shaft, 99, by means of a cord, 124, which passes over a guide pulley, 125, at the rear of the machine. This weight, however, may be replaced by a suitable spring, and we may here state that on the other hand weights may be substituted for the springs, 76, 96, before described if deemed desirable.

Arranged just in advance of the roller, 101, is a binder holder, 126, which is carried in an arc over the rolling bed by means of two arms, 127, pivoted at 128 to the base of the frame, 1, or other convenient part, which arms are provided at their upper ends with a cross bar, 129, upon which the side arms 130, of the binder holder are pivoted. The upper or outer ends of the side arms, 130, are connected by means of a binder supporting plate, 131, upon which the outer edge of the binder, 132, (Fig. 14) rests when placed in position for the reception of the scrap filler. Projecting beyond the lower edge of the plate, 131, as more clearly shown in Fig. 4, is a thin strip, 133, of rubber, metal or other flexible material which is secured preferably to the back or under side of the plate by means of a reinforce strip, 134, and screws or rivets, 135, such strip, 133, preferably extending entirely across the apron. When the parts are in their normal or retracted position the binder holder assumes the position shown in Fig. 4, and is so held by short angle arms, 126ª, secured to the arms, 130, and adapted to come against the arms, 127, but as the rocker arms, 102, move forward they strike against cam projections, 136, on the lower ends of the side arms, 130, and thus cause the binder to ride upward into the position shown in Fig. 14, carrying the binder, 132, with it and pressing the same against the apron covered roller, 101, by means of the flexible strip, 133. Thus holding the binder in a position favorable to its being rolled and at the same time preventing the scrap from spilling out of the loop or pocket formed in the apron as the bunch proceeds down the rolling table. Just before the bunch gains the lower end of the rolling table, a trip or lug, 137, on the inner side of one of the arms, 102, strikes a crank arm, 138, on the end of a rock shaft, 139, which carries a number of upwardly curved fingers, 140, thus causing said fingers to turn downward, whereupon the bunch is forced by the apron down upon a pair of upwardly curved fingers, 141, projecting from the under side of the angle iron, 109. As soon as the trip, 137, releases the crank arm, 138, the fingers, 140, are thrown upward again so as to grasp the bunch, by means of a coil spring, 142, sleeved on the shaft, 139, as shown in Fig. 2. The binder holder may be returned to its upper or original position by any suitable mechanism but we prefer to accomplish such movement by means of a pair of springs, 142ª, each attached at its ends respectively to one of the arms, 127, and the frame or other fixed part of the machine. The binder holder is arrested in its upward movement by means of stops, 143, projecting from the rails, 65, and arranged in the sweep of the arms, 127, thus preventing it from getting under the plunger or the funnel.

In practice we prefer that the various mechanisms above described should automatically cease operation or become inoperative when they resume their normal positions after the manufacture of each bunch. This result may be accomplished in many ways familiar to a skilled mechanic. The means which we have shown in the drawings and prefer to use, consist of a two part clutch mounted on the cam shaft, 45. The active clutch member, 144, which is driven by the power pulley, 146, is provided at its inner end with a number of sockets, 147, shown in dotted lines in Fig. 3, into any one of which engages a sliding dog or bolt, 148, located in a bore in the member 149 and held outward when not otherwise resisted, by a spiral spring, 150. The bolt, 148, is provided with a pin, 151, which projects outward through a slot, 152, in the member 149, and is arranged to be engaged at each revolution of the member 149, and consequently at the close of each complete operation of the machine, by a beveled shoe, 153, (see Fig. 2) and thus cause the compression of the spring, 150, and the withdrawal of the dog, 148, from the member, 144, the pin, 151, remaining in the engagement with the shoe by reason of the fact that the revolution of the member, 149, ceases before the pin has fully passed the shoe. The shoe, 153, is pivoted at 154 to the frame and held upward in the path of the pin 151 by means of a spring, 155, as shown in Fig. 2, and when it is desired to throw the machine into operation such dog may be lowered by means of a treadle, 157, connected therewith by a rod, 158. When the treadle is once depressed the machine will of course finish at least one complete operation and will continue to operate as long as the treadle is kept depressed. The driven member, 149, of the clutch is provided with a belt pulley, 160, which rotates with the said member and drives the agitator belt, 9, that passes over the pulley, 8. Hence the agitator is operated only when the other parts of the machine are active; and thus the scrap in the agitator box is saved an unnecessary churning that would result in its disintegration into too fine particles.

The stand, 2, if desired may be provided with a table, 159, for convenience in handling the binders preparatory to their introduction into the machine.

Referring now more particularly to Figs. 10 and 14, inclusive, and Fig. 15, which indicate the successive stages of the operation of the machine, it will be seen that in the first movement, Fig. 10, the funnel has been lowered by its cam, 74, with its end or matrix, 55, resting upon or very near the bottom of the apron pocket, and is catching the charge of scrap which is being delivered from the feeding cylinder from above, which charge it holds in proper form in such apron while the plunger descends upon it as in Fig. 11 and gives it the initial ram or compression, the feeding cylinder having emptied its lowermost pocket before the descent of the plunger took place. The nose, 93, of the plunger cam then passes the roller, 95, permitting the plunger to rise clear of the neck of the funnel, but the cam, 74, has not passed the roller, 73, and hence the funnel is still depressed, and before it does pass such latter roller, the second nose, 94, has reached the roller, 95, and again rammed the plunger home in the matrix, 55, this time carrying with it any delinquent fragments and completing the initial compression of the charge. As soon, however, as the plunger reaches the charge of scrap the second time, the cam, 74, releases the wheel, 73, and permits the funnel to rise until its cross head ends or heads, 63, strike the ends, 79, of the plunger cross head, 78, thus assuming the position indicated in Fig. 12, and giving the apron roller an opportunity to close the apron partly around the charge while the latter is yet under pressure from the plunger. And now when the nose, 94, has passed the roller, 95, both cross heads with their connected parts will ascend together, and at the same time the cam, 121, comes into play and actuates the apron actuating roller 101 and binder holder in the manner before described, such parts assuming first the position shown in Fig. 14, and finally that in Fig. 15, the bunch having in the meanwhile been caught by the bunch receiver at the lower end of the rolling bed. When the funnel ascends it strikes the leaves, 48, of the guide chute and causes them to fold up without injury as shown in Fig. 13. This is done for the sake of compactness.

Having described our invention, what we claim, and desire to secure by Letters Patent, is—

1. In a cigar bunching machine, the combination with an agitator box and a feeding device, of combined rotary scrap cleaners and agitators journaled immediately over said feeding device in said box, and the main agitator journaled in said box above said combined scrap cleaners and agitators, substantially as set forth.

2. In a cigar bunching machine, the combination with an agitator box and a feed cylinder having longitudinal feeding pockets; of combined scrap cleaners and agitators arranged in said box on both sides of the summit of said cylinder, longitudinally of the pockets therein, and a main agitator journaled over the summit of said cylinder above and between said combined scrap cleaners and agitators, and means for revolving said main agitator and combined scrap cleaners and agitators continuously in one direction, substantially as set forth.

3. In a cigar bunching machine, the combination with the feed cylinder shell or casing and a feeding device arranged therein, of an agitator box and combined rotary scrap cleaners and agitators journaled immediately over said feeding device in the lower part of said agitator box, the main agitator journaled in said box above and between said combined agitators and scrap cleaners, said agitator box being hinged to said shell whereby access may be had to the combined scrap cleaners and agitators for removing the collected litter therefrom, substantially as set forth.

4. In a cigar bunching machine, the combination of a revoluble feeding cylinder having a series of pockets formed in its periphery, provided with adjustable bottoms, an oppositely screw threaded shaft passing axially through said cylinder, winged nuts threaded on said shaft and links pivoted to the wings of said nuts and to the inner sides of said bottoms, so as to form toggle levers, substantially as set forth.

5. In a cigar bunching machine, the combination of the cylinder having diametrically arranged pockets provided with adjustable bottoms, and a central cored portion, toggle arms pivoted to said adjustable bottoms, nuts from which said toggle arms radiate and to which they are pivoted, a screw passing through said nuts and cored portion and a jam nut for locking said screw, substantially as set forth.

6. In a cigar bunching machine, the combination with a feeding device and a matrix, of two loosely hinged leaves for directing the filler into the matrix and stops for arresting the downward movement of said leaves, substantially as set forth.

7. In a cigar bunching machine, the combination with a feeding device and a movable funnel, of two downwardly hanging adjustable leaves arranged to be struck by said funnel and being adapted to direct the filler into the funnel and means for forcing the lower ends of said leaves toward each other, substantially as set forth.

8. In a cigar bunching machine, the combination of a feeder and a funnel, of loosely hinged upwardly folding leaves arranged under the feeder for throwing the filler to various points in the funnel, means for adjusting said leaves and a shield projecting from said feeder in front of said leaves, substantially as set forth.

9. In a cigar bunching machine the combination with the plunger and the bunch rolling device, of a reciprocating funnel through which said plunger works, said funnel being laterally adjustable with relation to said plunger, substantially as set forth.

10. In a cigar bunching machine the combination with the plunger and the bunch rolling device, of a guide way, a cross head adapted to reciprocate along said way and a funnel supported on said cross-head and being laterally adjustable thereon with relation to said plunger, substantially as set forth.

11. In a cigar bunching machine, the combination of a guide way, a cross head adapted to reciprocate along said way and carrying the scrap receiving funnel, curved crank arms working through the ends of said cross head and means for oscillating said crank arms, substantially as set forth.

12. In a cigar bunching machine, the combination with the plunger, a feeder and a rolling device having a bunch pocket; of a reciprocating funnel having a neck constituting a matrix, means for lowering the funnel into said pocket and for forcing the plunger into said funnel, so timed with relation to the funnel actuating mechanism as to cause the plunger to rise and fall twice while the funnel is yet in the bunch pocket, substantially as set forth.

13. In a cigar bunching machine, the combination with the plunger, a feeder and a rolling device having a bunch pocket; of a reciprocating funnel having a matrix, means for lowering the said funnel into the said pocket, means for discharging the feeder while the funnel is in said pocket, and means for depressing the plunger into the said funnel twice while the funnel is down, so timed with relation to the funnel actuating mechanism as to descend twice into the funnel while the latter is still lowered and after the feeder has discharged, substantially as set forth.

14. In a cigar bunching machine, the combination with a feeder and a rolling device having a bunch pocket; of a reciprocating funnel, a plunger working through said funnel, a single cam for operating the funnel, and a double cam for operating the plunger, substantially as set forth.

15. In a cigar bunching machine the combination with the plunger, and a rolling device having a bunch pocket; of a reciprocating funnel, a long cam for depressing said funnel, and a double cam for depressing the plunger into said funnel, one nose of the double cam being arranged to act upon the plunger while the long cam is acting, and the other nose being arranged beyond the long cam whereby it will act after the long cam has acted, substantially as set forth.

16. In a cigar bunching machine, the combination with the apron actuating device having the apron actuating roller supporting arms, 102; of a binder holder, rocker arms to which said holder is pivoted and by which it is supported, said binder holder having the cam projections, 136, adapted to be struck by said arms 102, as they move forward, substantially as set forth.

17. In a cigar bunching machine the combination with the apron actuating mechanism, of a binder holder, adapted to be actuated by said apron actuating mechanism, rocker arms carrying said binder holder, and stop pins, 126ª, adapted to strike against the said rocker arms for holding the binder holder at its normal position, substantially as set forth.

18. In a cigar bunching machine the combination with the plunger and feeder and a rolling device having a bunch pocket; of a reciprocating funnel, means for lowering said funnel into said pocket, and a double cam for forcing the plunger into said funnel, so timed with relation to the funnel actuating mechanism, so as to cause the plunger to rise and fall twice while the funnel is yet in the bunch pocket, substantially as set forth.

19. In a cigar bunching machine, the combination with the plunger and feeder and a rolling device having a bunch pocket; of a reciprocating funnel having a matrix, a single cam for lowering said funnel into said pocket, means for discharging the feeder while the funnel is in the said pocket, and a double cam for depressing the plunger into said funnel, substantially as set forth.

20. In a cigar bunching machine, the combination with a feeding mechanism and reciprocating funnel and a plunger working through said funnel; of the cam 44 for operating the feeder, a cam 74 for lowering said funnel, arranged in advance of said cam 44, and a double cam for lowering the plunger, said double cam being arranged to act after the cam 44 and during the action of the cam 74, and such cam 74 being of greater length than the cam 44 and of each of the portions of the double cam, substantially as set forth.

21. In a cigar bunching machine, the combination of the upright guide rails 65; two cross heads arranged on said rails, a funnel secured to one and a plunger secured to the other of said cross heads, crank arms for reciprocating said cross-heads, a single cam for oscillating the crank arms which operate the funnel cross-head, and a double cam for oscillating the crank arms which operate the plunger cross-head, the face of said single cam being longer than the combined length of the two faces of said double cam, substantially as set forth.

SAMUEL I. SMITH.
HENRY W. PEASE.

Witnesses:
R. C. OMOHUNDRO,
F. A. HOPKINS.